United States Patent
Ligman et al.

(10) Patent No.: US 9,558,014 B2
(45) Date of Patent: Jan. 31, 2017

(54) SYSTEM, METHOD AND APPARATUS FOR TRANSPARENTLY ENABLING SOFTWARE APPLICATIONS WITH ADAPTIVE USER INTERFACES

(71) Applicant: International Business Machines Corporation, Armonk, NY (US)

(72) Inventors: Joseph William Ligman, Wilton, CT (US); Marco Pistoia, Amawalk, NY (US); John Ponzo, Yorktown Heights, NY (US); Gegi Thomas, Piermont, NY (US)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 14/013,665

(22) Filed: Aug. 29, 2013

(65) Prior Publication Data
US 2015/0067664 A1    Mar. 5, 2015

(51) Int. Cl.
G06F 9/44    (2006.01)
G06F 9/45    (2006.01)

(52) U.S. Cl.
CPC .............. *G06F 9/4445* (2013.01); *G06F 8/33* (2013.01); *G06F 8/40* (2013.01); *G06F 8/41* (2013.01)

(58) Field of Classification Search
CPC .............. G06F 11/1448; G06F 11/1469; G06F 3/04842; G06F 11/1451; G06F 8/34; G06F 8/38; G06F 9/4443; G06F 8/33; G06F 8/40; G06F 8/41; G05B 2219/13153; G05B 2219/13152
See application file for complete search history.

(56) References Cited

U.S. PATENT DOCUMENTS 5,603,034 A * 2/1997 Swanson ............... G06F 9/4445
                                                                 717/111
7,877,461 B1    1/2011 Rimmer
(Continued)

OTHER PUBLICATIONS

William Hoarau and Sebastien Tixeuil, A language-driven tool for fault injection in distributed systems, Feb. 2005, retrieved online on Sep. 8, 2016, pp. 1-20. Retrieved from the Internet: <URL: https://www.lri.fr/~bibli/Rapports-internes/2005/RR1399.pdf>.*

(Continued)

*Primary Examiner* — Thuy Dao
*Assistant Examiner* — Hanh T Bui
(74) *Attorney, Agent, or Firm* — Harrington & Smith

(57) ABSTRACT

A method includes receiving, by a library instrumented into an application executable by a computing device, a message indicating modification(s) that should be performed to user interface component(s) able to be rendered by the application on a display of the computing device. The user interface component(s) are modified to create modified user interface component(s). The modified user interface component(s) are caused to be rendered on the display. Another method includes accessing a description of user interface component (s) for an application executable on a computing device, wherein the user interface component(s) are able to be rendered by the application on a display of the computing device. A developer is allowed to modify information concerning the user interface component(s). Message(s) are formed to allow modification(s) and corresponding user interface component(s) to be determined and the message(s) are sent to computing device(s) having the application. Apparatus, software, and computer program products are disclosed.

20 Claims, 12 Drawing Sheets

(56) References Cited

U.S. PATENT DOCUMENTS

| | | | | |
|---|---|---|---|---|
| 8,359,585 B1* | 1/2013 | Spinner | ............ | G06F 8/40 |
| | | | | 717/134 |
| 8,793,649 B2* | 7/2014 | Williams | ............ | G06F 8/20 |
| | | | | 717/111 |
| 2004/0163046 A1* | 8/2004 | Chu | ............ | H04L 67/36 |
| | | | | 715/251 |
| 2006/0101420 A1* | 5/2006 | Shinnar | ............ | G06F 8/51 |
| | | | | 717/130 |
| 2008/0127060 A1* | 5/2008 | Reamey | ............ | G06F 9/4443 |
| | | | | 717/106 |
| 2009/0241135 A1* | 9/2009 | Wong | ............ | G06F 9/4443 |
| | | | | 719/328 |
| 2011/0185354 A1 | 7/2011 | Tanner et al. | | |
| 2012/0137211 A1* | 5/2012 | Lewontin | ............ | G06F 17/30914 |
| | | | | 715/236 |
| 2012/0233044 A1 | 9/2012 | Burger et al. | | |
| 2012/0290914 A1* | 11/2012 | Lee | ............ | G06F 17/24 |
| | | | | 715/234 |

OTHER PUBLICATIONS

Plamen Paskalev, Rule based GUI modification and adaptation, ACM, 2009, retrieved online on Sep. 8, 2016, pp. 1-7. Retrieved from the Internet: <URL: http://delivery.acm.org/10.1145/1740000/1731841/a93-paskalev.pdf?>.*

* cited by examiner

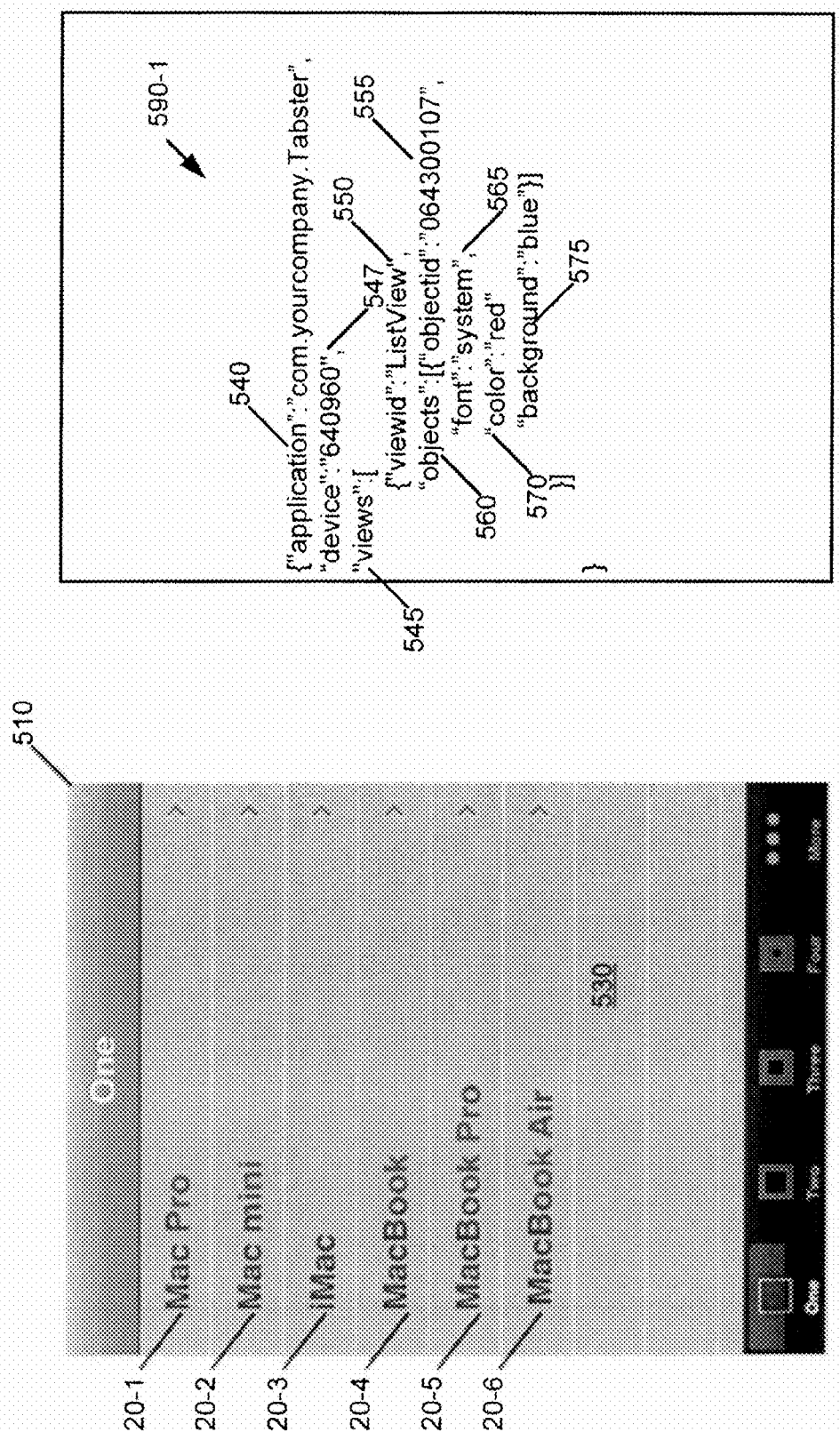

SYSTEM, METHOD AND APPARATUS FOR TRANSPARENTLY ENABLING SOFTWARE APPLICATIONS WITH ADAPTIVE USER INTERFACES

BACKGROUND

This invention relates generally to applications executed on computer systems and, more specifically, relates to transparently adapting user interfaces (UIs) for those applications.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Mobile applications and mobile application market places offer opportunity for developers to quickly release software in to a global market. After an application is deployed comes the challenge of managing the software through its application lifecycle. Managing and updating applications once deployed is a continual challenge for developers and product owners.

To alleviate this challenge, mobile application development has quickly adopted Web technologies as an attempt to directly address this post release management problem, for example, by hosting the client code on the server. This allows applications targeted for mobile devices to quickly update and deploy a new application layout as well as take advantage of "write once, run everywhere".

Another class of mobile application called Hybrid takes this approach one step further. Hybrid applications typically architect the application using a native container alongside a Web view to provide the presentation. The hybrid application lets the application access a native Software Development Kit (SDK) as well for functionality such as a camera, a Global Positioning System (GPS), and file storage.

These two approaches to mobile development cover most use cases. However, they have the drawback of providing a low fidelity user experience.

Native applications, on the other hand, provide an appropriate user experience for the device. Typically, a mobile platform offers a native Application Programming Interface (API) for developing applications targeted to run on the platform. This API defines the look and feel of the platform as well as the operating services that applications are allowed to access. Other web based approaches just approximate this look and feel the best they can using a markup language, and typically the end result is not very good.

Thus, it would be beneficial to improve the look and feel of applications while easing management and updating of the applications.

BRIEF SUMMARY

This section has examples of possible implementations of the exemplary embodiments. This section is not intended to be limiting.

In an exemplary embodiment, a method includes receiving, by a library instrumented into an application executable by a computing device, a message indicating one or more modifications should be performed to one or more user interface components of the application able to be rendered on a display of the computing device. The method includes modifying the one or more user interface components according to the one or more modifications to create one or more modified user interface components. The method further includes causing the one or more modified user interface components to be rendered on the display of the computing device. Apparatus and program products corresponding to this method are also disclosed.

In another exemplary embodiment, a method includes accessing a description of a number of user interface components for an application executable on a computing device, wherein the number of user interface components are able to be rendered by the application on a display of the computing device. The method includes allowing a developer to modify information concerning the one or more of the number of user interface components. The method further includes forming, responsive to one or more modifications by the developer to the information, one or more messages to allow the one or more modifications and the corresponding one or more user interface components to be determined. The method also includes sending the one or more messages to one or more computing devices having the application. Apparatus and program products corresponding to this method are also disclosed.

BRIEF DESCRIPTION OF THE SEVERAL VIEWS OF THE DRAWINGS

FIG. 5A illustrates a view of a UI of an application corresponding to a portion of the application model of FIG. 4;

FIG. 5B illustrates an exemplary protocol used to change objects in a view of an application corresponding to the view shown in FIG. 5A;

FIG. 9, including

DETAILED DESCRIPTION

The exemplary embodiments describe systems, methods, apparatus, and program products for transparently enabling software applications with adaptive user interfaces.

Adaptive user interfaces (UIs) and UI updates have a direct impact on the application delivery of native user interfaces and give the application owner an advantage in a low overhead updating mechanism to provide high fidelity UIs while also providing a level of security in controlling the data that is displayed on the device while running these applications.

Adaptive UIs allow for updates and modifications in a post-deployed system. This is needed for providing an up-to-date user experience, security, and application management after releasing mobile applications in to the "wild".

This approach may allow for an application administration to push out application updates without the need for modifying or examining the source code of an application. Other exemplary benefits are described below.

Although primary emphasis is placed below on mobile applications, many different types of applications have user interfaces that could benefit from the exemplary embodiments herein. For instance, many automobiles have interactive displays in them, and such interactive displays are designed and defined using User Interfaces (UIs) from applications. Therefore, the instant exemplary embodiments have wide applicability and the FIGS. 1 and 2 illustrate such wide applicability.

Figure 1:
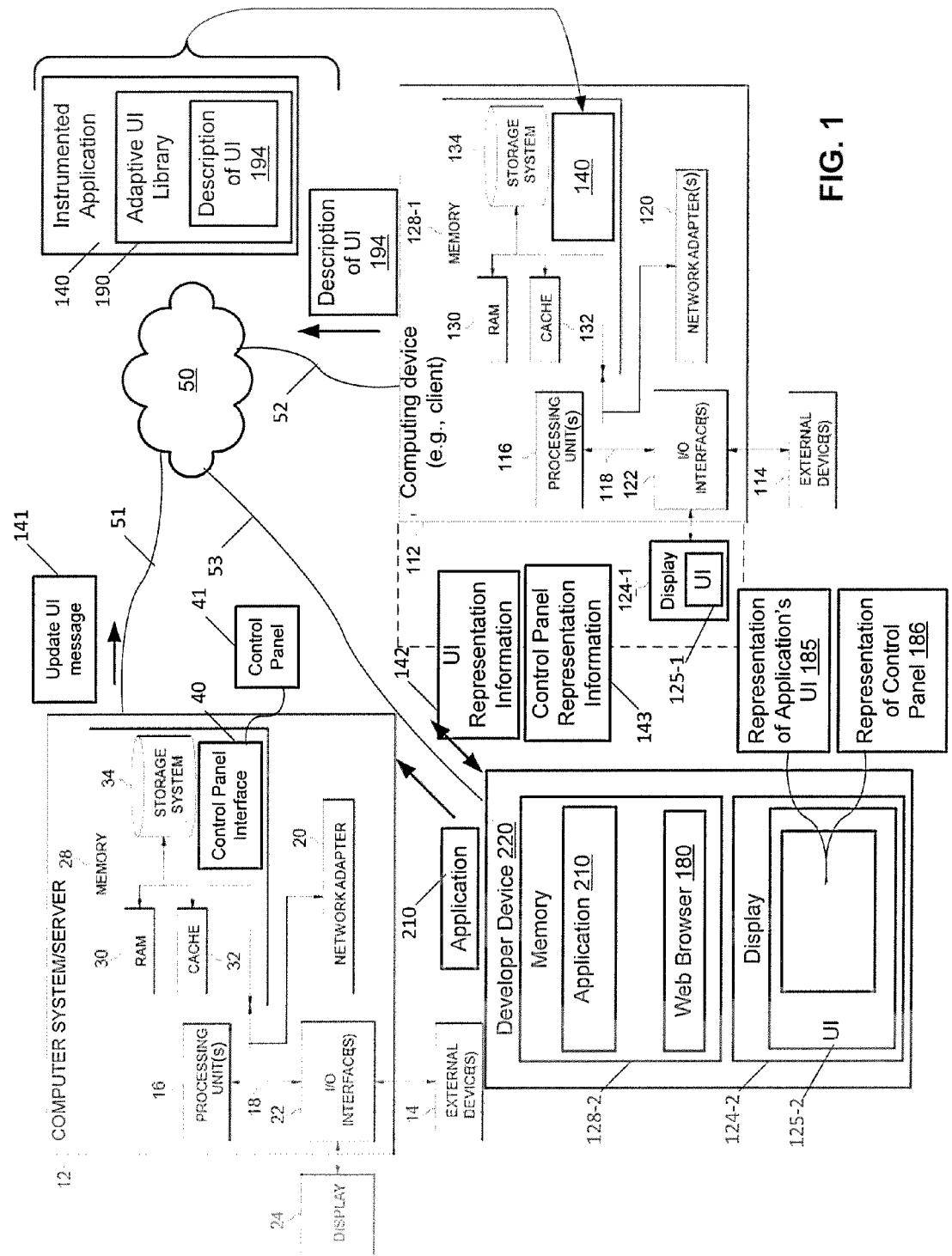
FIG. 1 is a block diagram of a computing device and a server in communication via a network, in accordance with an exemplary embodiment of the instant invention.
Figure 2:
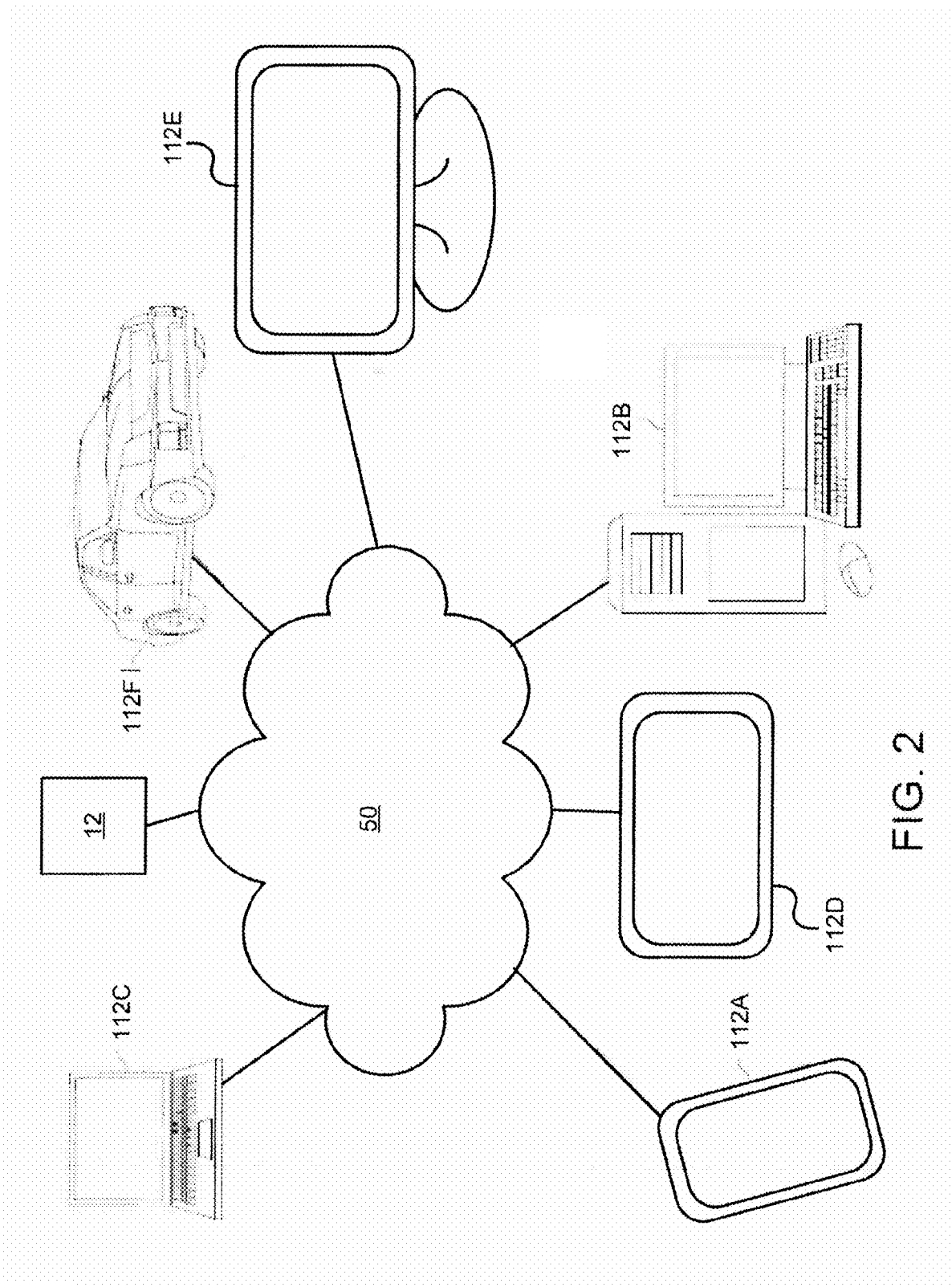
FIG. 2 depicts a networked environment according to an exemplary embodiment of the present invention.

Reference is made now to FIG. 1, which shows a block diagram of a computing device and a server in communication via a network, in accordance with an exemplary embodiment of the instant invention. FIG. 1 is used to provide an overview of a system in which exemplary embodiments may be used and to provide an overview of certain exemplary embodiments. In FIG. 1, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

As shown in FIG. 1, computer system server 12 is shown in the form of a general-purpose computing device. The components of computer system/server 12 may include, but are not limited to, one or more processing units 16 (e.g., processor(s)), a system memory 28, and a bus 18 that couples various system components including system memory 28 to the one or more processing units 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Computer system/server 12 typically includes a variety of computer system readable media, such as memory 28. Such media may be any available media that is accessible by computer system/server 12, and such media includes both volatile and non-volatile media, removable and non-removable media. System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a removable, non-volatile memory, such as a memory card or "stick" may be used, and an optical disk drive for reading from or writing to a removable, non-volatile optical disk such as a CD-ROM, DVD-ROM or other optical media can be provided. In such instances, each can be connected to bus 18 by one or more I/O (Input Output) interfaces 22. Memory 28 includes a control panel interface 40 in this example.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via, e.g., I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, and the like.

The computing device 112 also comprises a memory 128-1, one or more processing units 116, one or more I/O interfaces 122, and one or more network adapters 120, interconnected via bus 118. A memory 128 may comprise non-volatile and/or volatile RAM, cache memory 132, and a storage system 134. Depending on implementation, a memory 128 may include removable or non-removable non-volatile memory. The memory 128 includes in this example an instrumented application 140 that includes an adaptive UI library 190 (which includes a description 194 of the UI of the application 140). The computing device 112 may include or be coupled to the display 124-1, which has a UI 125-1. Depending on implementation, the computing device 112 may or may not be coupled to external devices 114. A display 124 may be a touchscreen, flatscreen, monitor, television, projector, as examples. A UI 125 may be any UI for an application and/or an operating system for the particular computing device 112. The bus 118 may be any bus suitable for the platform, including those buses described above for bus 18. The memories 130, 132, and 134 may be those memories 30, 32, 34, respectively, described above. The one or more network adapters 120 may be wired or wireless network adapters. The I/O interface(s) 122 may be interfaces such as USB (universal serial bus), SATA (serial AT attachment), HDMI (high definition multimedia interface), and the like. The one or more processing units 16, 116 may be any suitable controller(s) for controlling operation of a respective computing device, such as general purpose processors, single- or multiple-core processors, application specific integrated circuits, systems-on-a-chip, programmable logic, and the like.

The UI 125-1 may contain elements from both the instrumented application 140 and, e.g., an operating system for the platform for which the instrumented application 140 has been developed. However, for simplicity, the UI 125-1 is assumed herein to be created by the instrumented application 140 (e.g., and the adaptive UI library 190). Thus, the UI 125-1 is assumed to be the application's UI, although technically the UI 125-1 could contain elements for the operating system.

A developer device 220 is also shown in FIG. 1. The developer device 220 can be considered to be similar to the computing device 112 and thus the internals (other than the memory 128-2, display 124-2 and UI 125-2) of the developer device 220 are not shown. The developer device 220 includes a memory 128-2 comprising an application 210 and a Web browser 180. The UI 125-1 may include one or both of a representation 185 of the application's UI and a representation 186 of a control panel.

In this example, the computer system/server 12, the computing device 112 and the developer device 220 are interconnected via network 50 and links 51, 52, and 53. Network 50 is typically the Internet, but may be other networks such as a corporate network.

Elements of, and interactions between elements in, the system in FIG. 1 are explained in more detail below. However, a brief introduction of exemplary interactions is now presented. In an exemplary embodiment, the application 210 is instrumented with the adaptive UI library 190 to create the instrumented application 140. The instrumenting may be performed, for instance, by the computer system/server 12, the developer device 220, or come other computer system. The developer or other person may perform the instrumenting. It is assumed that the application 220 is instrumented into the instrumented application 140 prior to installation of the instrumented application 140 on the computing device 112.

Once the instrumented application 140 begins executing on the computing device 112, the adaptive UI 190 captures, while the instrumented application 140 is running, a description 194 of the UI (e.g., the views) of the instrumented application 140, broken down into its various components and including layout information for those components. A component is any object that is derived from a system defined UI renderable component, which is defined by the system as the most basic UI object which all other UI objects are derived. The information in the description is captured from the various components using reflection or other means of object introspection. In object oriented programming languages, reflection allows inspection of classes, interfaces, fields and methods at runtime without knowing the names of the interfaces, fields, methods at compile time. Reflection also allows instantiation of new objects and invocation of methods. This description 194 is sent by the adaptive UI 190 to the control panel interface 40 using, e.g., standard Internet protocols.

Figures 6A, 6B:
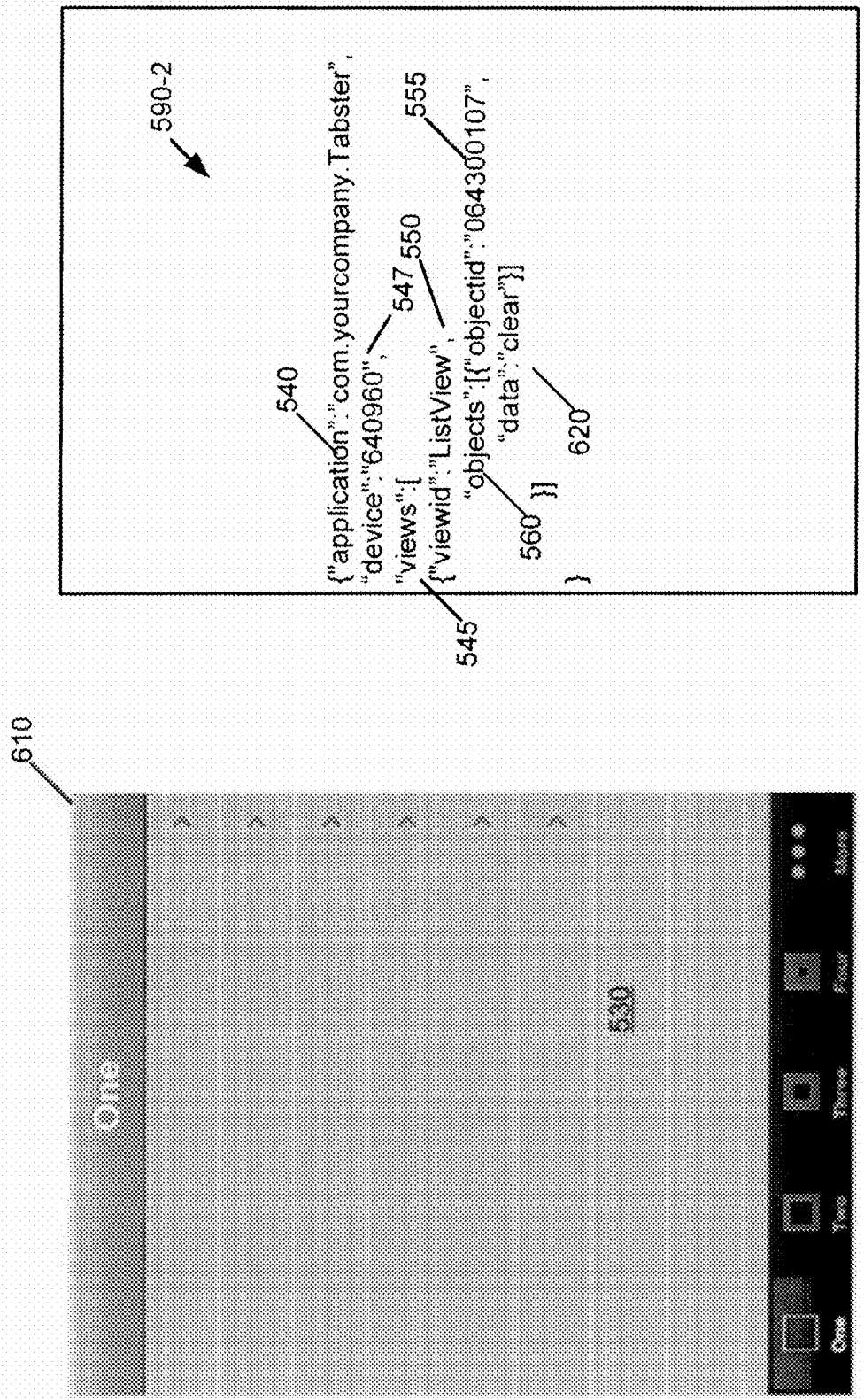
FIG. 6A illustrates another view of a UI of the application similar to the view in FIG. 5A, except the text objects have been cleared from the view.
FIG. 6B illustrates an exemplary protocol used to wipe the text objects from the view of FIG. 5A to create the view in FIG. 6A.
Figure 6C:
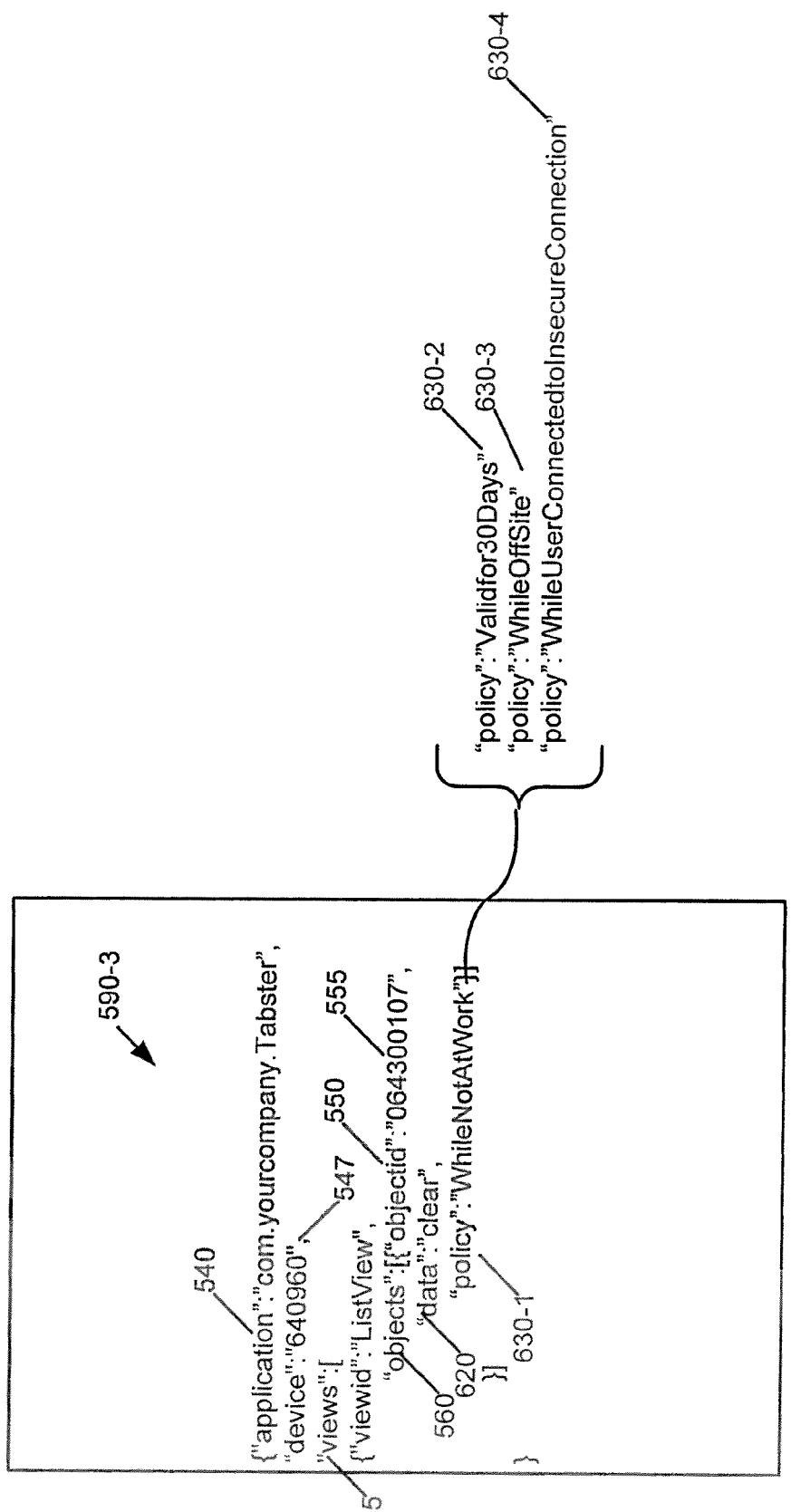
FIG. 6C illustrates an exemplary protocol used to wipe the text objects from the view of FIG. 5A to create the view in FIG. 6A, where the wipe is to be implemented according to a policy.

The developer, using the developer device 220, accesses a representation 186 of a control panel and, in this example, a representation 185 of a version of an application's UI by using the Web browser 180 to access the control panel interface 40. A Web browser 180 is one typical way of presenting the data captured from the computing device 112 device to a developer. However, the data/protocol used to upstream the data from the computing device 112 to the control panel 41 is independent of the actual rendering of the control panel 41. That is, the Web browser 180 is merely one example of how a developer may access the control panel 41 and other options are possible. The computer system/server 12 sends the UI representation information 142 and the control panel representation information 143 to developer device 220. The Web browser 180 presents this information on the UI 125-2 as representation 185 of the application's UI and representation 186 of the control panel, respectively. The developer, using the Web browser 180, can modify information on the representation 186 of the control panel and the Web browser 180 will send revised control panel representation information 143 to the computer system/server 12. The control panel interface 40 may send revised control panel representation information 143 and/or revised UI representation information 142 in response to the revised control panel representation information 143 sent by the developer device 220. The computer system/server 12 then uses the revised representation 186 of the control panel to send update message(s) 141 to the computing device 112. Exemplary protocol for the update messages is shown in FIGS. 5B, 6B, and 6C. The adaptive UI library 190 receives the update message(s) 141 and can revise a view of the UI 125-1. The view is not shown on UI 125-1 in FIG. 1 but is shown in other figures.

The control panel interface 40 is, in one example, computer-readable code that, in response to execution of the code by the processing unit(s) 16, causes the computer system/server 12 to perform operations described herein. The instrumented application 140 and the instrumented adaptive UI library 190 are, in one example, computer-readable code that, in response to execution of the code by the processing unit(s) 216, cause the computing device 112 to perform operations described herein.

Turning to FIG. 2, a networked environment is illustrated according to an exemplary embodiment. In this example, the computer system/server 12 is shown separate from network 50, but could be part of the network. There are A through E different computing devices 112 shown: smartphone 112A, desktop computer 112B, laptop 112C, tablet 112D, television 112E, and automobile computer system 112F. Not shown but equally applicable are set-top boxes and game consoles. These are merely exemplary and other devices may also be used. Thus although the examples provided below place primary emphasis on mobile devices, such as the smartphone 112A or the tablet 112D, the ins techniques may be applied to many other computing devices.

The overall system as shown in FIG. 1 allows a developer (e.g., an application owner) to perform the following tasks without looking at or modifying the source code of the application.

Adaptive UIs 190 provide UI experiences that can be changed after the application 210 has been released and installed on client machines (e.g., computing devices 112) as the instrumented application 140. The following are non-limiting examples related to the adaptive UI library 190. The adaptive UI library 190 is written using the native APIs provided by the development platform. For instance, the native API could be one for, e.g., iOS (a mobile operating system developed and distributed by Apple Inc.), for Android (an operating system designed by Google, Inc. primarily for touchscreen mobile devices such as smartphones and tablet computers), or for Windows (an operating system designed by Microsoft, Inc. for computer systems, tablets, and phones). The adaptive UI library 190 is transparent to the developer, and may be injected in the application 210 at a post-compile time. The adaptive UI library 190 can add, remove or reposition UI components within an application view. The adaptive UI library 190 can modify the look or color of a component. The adaptive UI library 190 can wipe sensitive data from the viewing area. The adaptive UI library 190 can modify the text rendering characteristics (such as font type and size) for the UI 125-1.

Thus, the adaptive UI library system allows for updates to the application's UI after the application has been released. Furthermore, UI policies can be compiled into the application (e.g., instrumented application 140), pushed to the computing device 112, or polled by the computing device 112 from an application server (e.g., computer system serer 12). The adaptive UI library 190 may define a language, protocol and policy for controlling the user interface on one of, a set of, or all of the applications that are deployed.

Now that an overview of a system and an exemplary embodiment has been provided, more detail about additional exemplary embodiments is provided.

Figure 3:
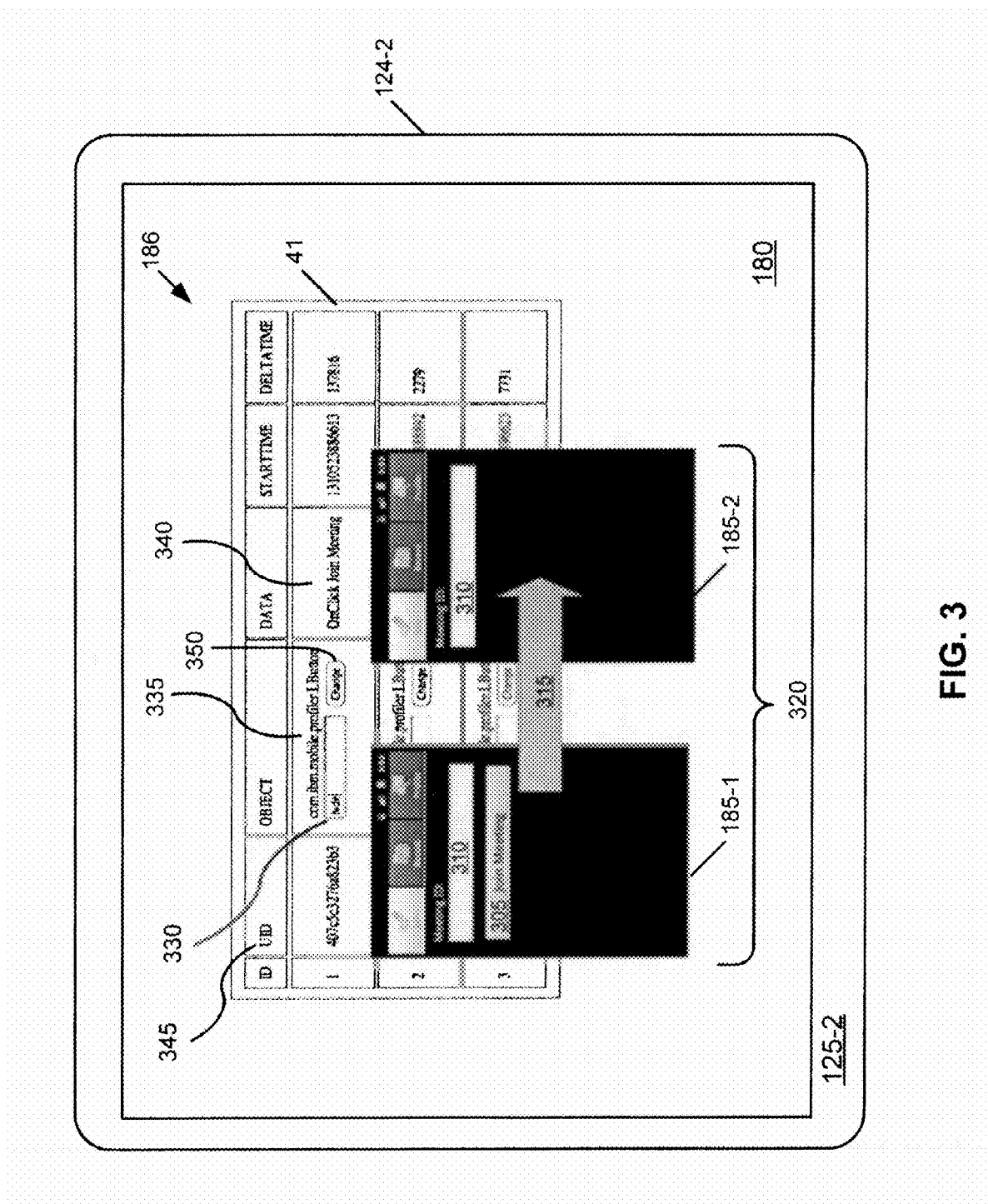
FIG. 3 is an illustration of a representation of a control panel and representations of the application's UI.

Referring to FIG. 3, this figure is an illustration of a representation 186 of a control panel 41 and representations 186-1, 186-2 of the application's UI. These are presented by the Web browser 180 on a UI 125-2 of the display 124-2 of the developer device 220. In this example, the UID 345 is a unique identifier (LID) assigned to a given device running the application. There is also a unique identifier assigned to each relevant component in the UI. The start and delta time are extraneous in certain embodiments (but may be used in others), recording when the program was started and the delta between server report intervals. It is noted that since there are CIDs for devices, a developer can tailor modifications to a single device, some set of devices, or all devices. The developer is using the Web browser 180 to modify a property 330 of the object 335 com.IBM.mobile.profiler.L-Button (in this case, the label shown is the fully qualified name of the Java class), which is one UI component able to be modified by the developer using the control panel 41. This object 335 creates the button 305 (having the text "Join Meeting") and, as the data 340 of "OnClick Join Meeting" illustrates, upon clicking the button 305, a user would be allowed to join a meeting (corresponding to the Meeting ID box 310). The property 330 controls whether the button 305 created by the object 335 should be visible or hidden. In this case, the developer has changed the property from "visible", which is illustrated by representation 185-1 of the application's UI, to "hide", which is illustrated by representation 185-2 of the application's UI. The property "hide" takes effect once the developer presses the "Change" button 350 in the representation 186 of the control panel 41.

The set 320 of representations are connected by the arrow 315, which indicates to the developer how the original view (as illustrated by representation 185-1) of the application 210 is modified to a new view (as illustrated by representation 185-2). The computer system/server 12 sends the appropriate UI representation information 142 and control panel representation information 143 to create the indicated information on the UI 125-2. Similarly, the Web browser 180 and developer device 220 sends the changes made by the developer to the computer system/server 12. FIG. 3 is merely exemplary and the information shown may not be presented in this manner. For example, only one representation 185 of the application's UI may be shown at a time, and the representation 185-1 would be shown prior to the developer clicking the "Change" button 350, and the representation 185-2 would be shown after the developer has clicked the "Change" button 350. Additionally, there may be other embodiments, such as having the representation 186 of the control panel include buttons such as "implement change" (e.g., which causes the Web browser 180 to send a message to the control panel interface 40 to request the control panel interface 40 actually implement the change on one or more instrumented applications 140) or "discard change" (e.g., which discards the current change and leaves the view in a previous state). Furthermore, there could be options to allow a developer to make several changes at once and to implement all changes (or discard all changes).

Figure 4A:
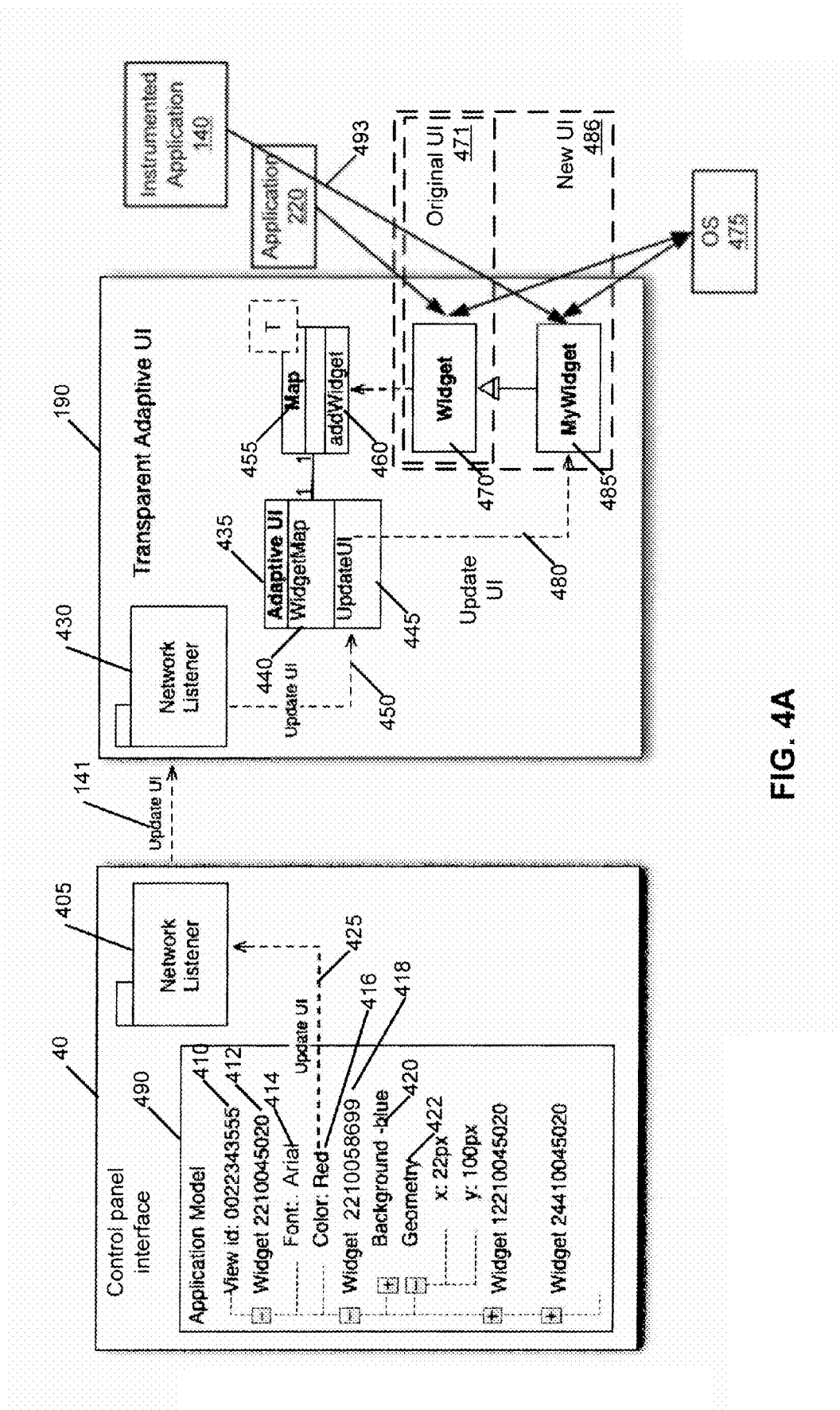
FIG. 4A is an illustration of an exemplary system design to provide dynamic UI updates from a Web-based control panel.

Concerning a system design for dynamic UI updates, FIG. 4A is an illustration of an exemplary system design to provide dynamic UI updates from a Web-based control panel. This diagram shows a structural representation of how a control panel (illustrated as control panel interface 40) maps to the program (i.e., the adaptive UI 190) running on the client. The diagram also indicates a typical tree structure for UI layouts. The control panel interface 40 is shown having an application model 490, which is a model of the UI 125-1 for the application 210. The application model 490 includes a view id (identification) 410 and a widget indication 412, each of which is unique relative to other views and widgets in the UI 125-1. The widget 412 corresponds to text objects 520 in FIG. 5A, described below. The number 2210045020 is a unique ID (identification) for the widget. The widget 412 has two attributes, font 414 (of Arial) and color 416 (of Red). The widget 418 corresponds to a background object 530 shown in FIG. 5A. The widget 418 includes two attributes background 420 (blue in this example) and geometry 422 (with an x of 22px and a y of 100px, where "px" is pixels.

In this example, the user has changed the color variable 416 from some other color to red. The control panel interface 40 generates an update UI message 425 and informs the network listener 405, which sends an update UI message 141 to the computing device 112. The message 141 is received by the adaptive UI library 190, specifically by the network listener 430. The adaptive UI library 190 in this example is shown in a class diagam. The network listener 430 forwards an update UI message 450 to the adaptive UI library object 435. The adaptive UI library 190 maintains (e.g., via a WidgetMap 440) a Map object 455 of Widget instances 470, and this library is created when the program starts running (e.g., during a discovery phase). The Widget instances 470 basically define the original UI 471, while the MyWidget instances 485 (e.g., in combination with the Widget interfaces 470) define the new UI 486. The adaptive UI library 190 understands how to interact with the map of widgets through the common Widget 480 interface (e.g., using the UpdateUI object 445). The adaptive UI library 190 looks up (e.g., via the Adaptive UI object 435) the target widget in the Map object 455. The figure shows the target Widget specific instance labeled MyWidget object 485. The update UI message 450 is forwarded to the MyWidget object 485 after retrieving the target from the Map object 455. The MyWidget object 485 then stores a command (in an example) corresponding to the update UI message 480 and sets itself to the operating system (OS) 475 as changed. When the operating system 475 calls back to the target, MyWidget object 485, the view is rendered accordingly. This is described in more detail below.

FIG. 4A also illustrates, in a simplistic manner, interactions between applications, portions of the instrumented measurement library 190, and the OS 475, with and without the adaptive UI 190. It is assumed herein, for ease of reference, that the original application 220 created an original UI 471 using the Widget class/object 470 and other instances of the object. The Widget class/object 470 interacted with the OS 475 in order to modify or change a view on the UI 125-1 of the display 124-1. It is noted that the Widget class/object 470 is part of the application 220 but is shown separately for ease of reference. In the adaptive UI 190, the MyWidget class/object 485 (which is part of the instrumented application 140) overrides the Widget class/object 470. The instrumented application 140 calls the MyWidget class/object 485, instead of calling the Widget class/object 470. The MyWidget class/object 485 (and other instances thereof formed by the adaptive UI 190 and overriding original classes/objects in the application 220) is considered to, for ease of reference, create the new UI 486. For class/object overriding, the parent class/object is the Widget class/object 470 and the child class/object is the MyWidget class/object 485. The reason one still sees the parent object in the diagram is because the child object works as a proxy to the parent. Conditionally, the child will replace the functionality of its parent, for example changing the font color attribute of a text field to the color red. The realization of this font change might actually lie outside the responsibility of this object chain (e.g., and lie in other subsystems); however, the attribute that indicates this change to other subsystems is controlled by the overriding child object.

Figure 4B:
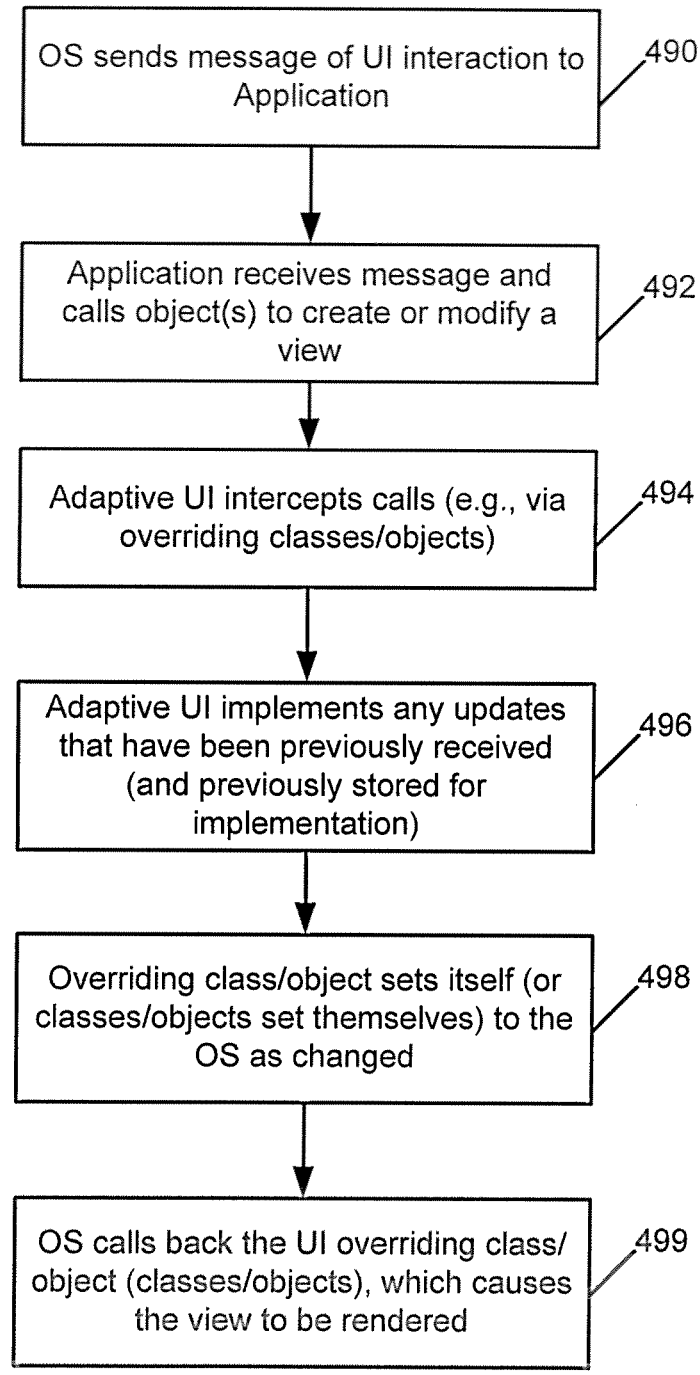
FIG. 4B is a logic flow diagram for OS, application, and adaptive UI interaction based on FIG. 4A, and illustrates the operation of an exemplary method, a result of execution of computer program instructions embodied on a computer readable memory, and/or functions performed by logic implemented in hardware, in accordance with an exemplary embodiment.

Turning to FIG. 4B in addition to FIG. 4A, a logic flow diagram is shown for OS, application, and adaptive UI interaction based on FIG. 4A. FIG. 4B also illustrates the operation of an exemplary method, a result of execution of computer program instructions embodied on a computer readable memory, and/or functions performed by logic implemented in hardware, in accordance with an exemplary embodiment. In the example of FIG. 4B, in block 490, the OS 475 sends a message of UI interaction to the application, in this case, the instrumented application 140. The instrumented application 140 receives (block 492) the message and calls one or more object(s) to create or modify a view in accordance with its own programming. In block 494, the adaptive UI 190 intercepts calls 493 (e.g., via overriding classes/objects 485), In block 496, the adaptive UI 190 implements any updates that have been previously received (and previously stored, e.g., as command(s) for implementation). That is, the overriding class/object 485 may have previously received the update UI message 480 and may have stored this message (e.g., as a command) for implementation when the overriding class/object 485 is called by the instrumented application 140. The overriding class/object 485 implements any updates. It is noted while the child object (the overriding class/object 485) exists in memory, the child object may store the end result of the message 480 as attributes of the child object. Additionally, the messages may be stored in key/value form in the map class/object 455, under the condition that the lifecycle of the overriding class/object 485 has come to an end. If the lifecycle has come to an end, the changes may get implemented upon instantiation of a new object 485. That is, the custom widgets 485 query their UI policy from the map 455 during instantiation. If the objects 485 are not referenced in the map, the objects 485 will take on the default UI as defined in the application. Also, the map 455 persists throughout the life of the application, and new objects are automatically subclassed (or categorized) as the objects are created by, e.g., overriding the class-loader in Java or method swizzling in iOS. When the application is started, the application 140 typical checks the server 12 for any updates to its policy. In block 498, the overriding class/object 485 sets itself (or classes/objects 485 set themselves) to the OS 475 as changed. In block 499, the OS 475 calls back the UI overriding class/object 485 (classes/objects 485), which causes the view to be rendered on the display.

Turning to FIG. 5A, this illustrates a view 510 of a UI of an application 140 corresponding to a portion of the application model of FIG. 4. In this example, the text objects 520-1 through 520-6 correspond to the widget object 412, and are in Arial font with red coloring. The background 530 corresponds to the widget object 418 and has a blue background.

FIG. 5B illustrates an exemplary protocol 590 used to change objects in a view 510 of an application corresponding to the view shown in FIG. 5A. The protocol for dynamic UI changes can be delivered to the client (e.g., computing device 112) using a standard Web browser. The protocol is consumed by the client and modifies the UI by interfacing to existing runtime objects. This protocol 590 could, for instance, be used in the update UI messages 141 to effect changes to the UI for the instrumented application 140. The protocol 590 may be implemented, for instance, in JSON (the server response content type is application/son). JSON (JavaScript Object Notation) is a lightweight data-interchange format. The communication between the instrumented application 140 and the server 12 may a typical REST (REpresentational State Transfer) architecture. The application 140 makes its own "direct" connection to the server 12 and therefore understands that the server response (JSON, HTML, or otherwise) is paired with a respective request from the application 140. Selecting an object using the Web browser 180 allows for modification of that object's appearance (or other features) on the client's UI (the UI caused by instrumented application 140). Selected objects may be grouped into a tree structure that mimics the view tree. That is, typical views of applications are structured in a view tree, and the selected objects to be modified may be grouped into a tree structure mimicking the view tree.

In this example, the protocol 590-1 includes an indication 540 of the application ("application":"com.yourcompany-.Tabster") and an indication 547 of the device ("device": "640960"). The view is indicated 550 by "views" 545 and by "viewid":"ListView", and an object within that view is indicated 560 by "objects" and the indication 555 "objectid":"064300107". It can be assumed that the view ID of ListView in FIG. 5B is the same as the View id 410 in FIG. 4. It does not matter what the view ID is as long as the view ID is unique. The indication 566 indicates the "font": "system" has a red color (as indicated by indication 570 of "color":"red"). Thus, the adaptive UI library 190 can determine that the font color is supposed to be red and effectuate this change as described in reference to FIG. 4. FIG. 5B further shows another attribute that may be changed. As illustrated by the indication 575 ("background":"blue"), the background may be changed from whatever color the background originally was to the color blue.

It can also be seen that the protocol 590-1 is organized in a tree structure that corresponds to a view tree of the application, as the protocol 590-1 indicates which view (e.g., a "trunk" or "main branch" of the "tree") is affected (via 545, 550) and indicates the objects 520-6 (e.g., the "leaves" or "smaller branches" as the case may be of the "tree") that are affected (via 560, 555, 565, 570, and 575).

Referring to FIG. 6A, this figure illustrates another view 610 of the application 140 similar to the view in FIG. 5A, except the text objects have been cleared from the view 610 (as compared to the view 510 of FIG. 5A), FIG. 6B illustrates an exemplary protocol 590-2 used to wipe the text objects from the view of FIG. 5A to create the view in FIG. 6A. In this case, associated with the text object (as indicated by indication 560) is a command to clear the data in the text object. The command is illustrated by indication 620, "data-":"clear".

An extension to the above concerns policies. A developer may decide that a modification (or modifications) to a UI should be based on a policy or based on multiple policies. Illustratively, the developer may choose to implement a modification temporarily (e.g., for a specific time period) or permanently. As another example, the developer may choose to enforce policies either automatically or manually. Such policies may include limiting a number of copies (e.g., via a selection button on the UI and limiting the number that can be selected by a user using the selection button), preventing copying by clearing a value on the UI, disallow forwarding (e.g., by removing a "forward button"), and the like. Manual enforcement is where the developer, using the Web browser 180, causes the policy, for instance, by setting a value of the number of allowed copies for a selection button to be a specific value. Automatic enforcement involves the developer creating, using the Web browser 180, a policy such as "policy":"LimittoValue10" for the selection button. Manual enforcement typically causes the policy to be implemented immediately, typically without regard to other constraints. Meanwhile, the automatic policies may involve other constraints, have such as having time limits, e.g., to cause the modification to the UI for a length of time, cause the modification only during working hours (or only during after-work hours) and the like. The policies may cause a modification to be effected based on location of the computing device 112, user action taken on the UI, time of day, sensor data, and the like.

FIG. 6C illustrates an exemplary protocol used to wipe the text objects from the view of FIG. 5A to create the view in FIG. 6A, where the wipe is to be implemented according to a policy. The policy in this example is illustrated by indication 630-1, "policy":"WhileNotAtWork", which means that while the computing device 112 can determine the user is not at work, the "clear" action will be effected. Similarly, the policies could be the following: "policy": "Validfor30Days" (reference 630-2), indicating that the "clear" action should be valid for 30 days; "policy":"WhileOffSite" (reference 630-3), indicating the "clear" action should be effected while the computing device 112 is off site; d "policy":"WhileUserConnectedtoInsecureConnection" (reference 630-4), indicating the "clear" action should be effected while the user (and the computing device 112) is connected to an insecure connection.

Figure 7A:
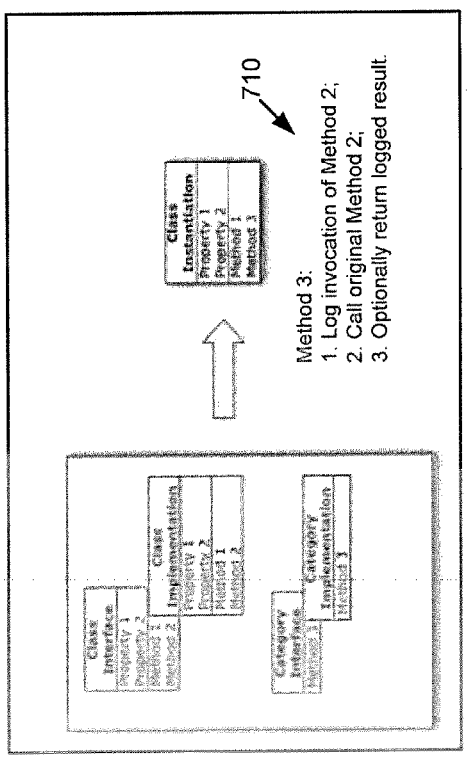
FIG. 7A illustrates an example of instrumenting an iOS application using categories and swizzling.

As described above, the adaptive UI library 190 may be instrumented into the application 210 to create the instrumented application 140. The adaptive UI library 190 can be injected into applications with minimal or no source code modifications. The adaptive UI library 190 therefore may be transparent to developers. Two implementations are now described, iOS and Android, although other implementations such as Windows are possible. Injecting the Adaptive UI library into the client is performed differently on iOS and Android. On iOS, injection may be achieved via the Xcode linker during the application's compilation and linking stages. FIG. 7A illustrates an example of instrumenting an iOS application using categories and swizzling. Specifically, FIG. 7A is a structural representation showing the overriding of an object's behavior. This code needs to be compiled and linked in to the source application. In this example, Method 3 overrides Method 2. As indicated by reference 710, Method 3 will perform the following to override Method 2's behavior: 1. Log the invocation of Method 2; 2. Call the original Method 2; and 3. Optionally return a logged result.

Figure 7B:
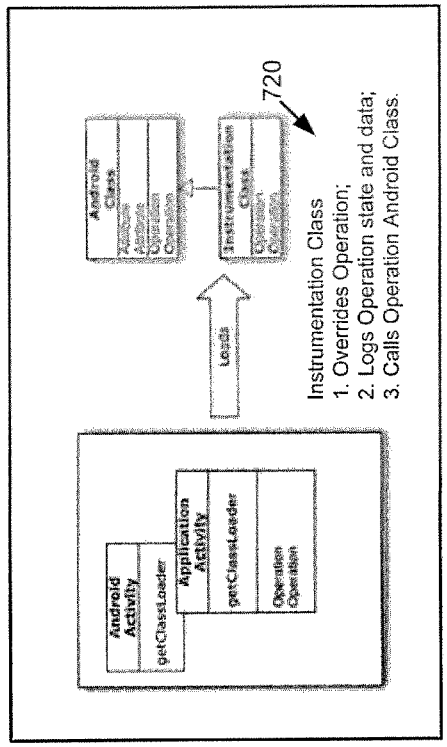
FIG. 7B illustrates an example of instrumenting an Android application using class loading.

On Android, the injection may be performed via Java bytecode rewriting, without any need for source code access, or relinking and recompiling the application. FIG. 7B illustrates an example of instrumenting an Android application using class loading. In this example, as illustrated by reference 720, the Instrumentation Class performs the following: 1. Overrides the Operation class; 2. Logs Operation state and data; and 3. Calls the Operation Android Class.

Figure 8:
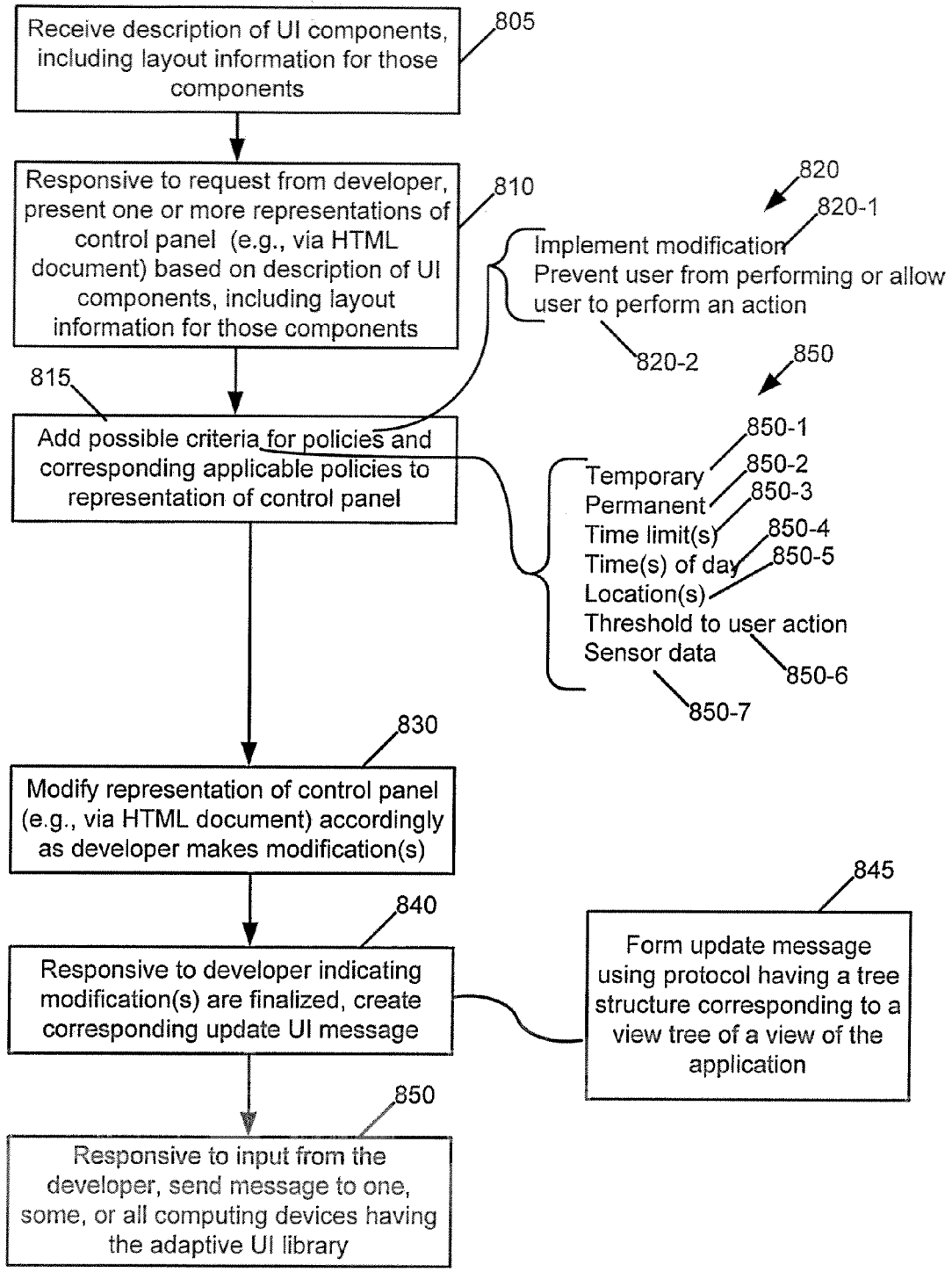
FIG. 8 is a logic flow diagram performed by a computer system/server 12 for transparently enabling software applications with adaptive user interfaces, and illustrates the operation of an exemplary method, a result of execution of computer program instructions embodied on a computer readable memory, and/or functions performed by logic implemented in hardware, in accordance with an exemplary embodiment.

Referring to FIG. 8, this figure is a logic flow diagram performed by a computer system/server 12 for transparently enabling software applications with adaptive user interfaces. Further, this figure illustrates the operation of an exemplary method, a result of execution of computer program instructions embodied on a computer readable memory, and/or functions performed by logic implemented in hardware, in accordance with an exemplary embodiment. The blocks in FIG. 8 may be assumed to be interconnected means for performing the corresponding functions in the blocks. The operations in the blocks are assumed to be performed by the computer system/server 12, e.g., under control of the control panel interface 40.

In block 805, the computer system/server 12 receives, from the computing device 112, description of UI components, including layout information for those components. In block 810, the computer system/server 12, responsive to one or more requests from a developer (e.g, using the developer device 220), presents one or more representations 186 of a control panel based on the description of UI components, including layout information for those components. The representation 186 may be via one or more HTML (HyperText Markup Language) documents or via any other technique useful for allowing a developer to view the description.

In block 815, the computer system/server 12 adds possible criteria for policies and corresponding applicable policies to the one or more representation 186 of the control panel. The policies 820 may include policies such as "implement modification" 820-1, which might be used to indicate that a modification should be implemented based on the corresponding criteria 850. The policy 820-2 may be used to prevent a user from performing or allow the user to perform an action. For instance, the policy may be to automatically prevent a user from making (or allow a user to make) over a certain number of copies, to prevent a user from making (or allow a user to make) any copies, to prevent (or allow) forwarding of a message, and the like.

Exemplary criteria 850 include the following non-limiting criteria: the policy 820 may be temporary 850-1 (e.g., for a time period indicated by time limit 850-3): the policy 820 may be permanent 850-2; the policy may have certain time limits 850-3 (such as a day, a week, a month, etc.); the policy 820 may have a time of day limitation 850-4 (e.g., only during working hours or only during after-working hours);

the policy 820 may be limited to one or more locations 850-5 (e.g., only at work or only at home); the policy 820 may be a threshold to a user action 850-6 (e.g., only three copies may be made); or the policy 820 may be based on sensor data 850-7 (e.g., only allow a function if connected to a secure network as determined by a Wi-Fi sensor).

In block 830, the computer system/server 12 modifies the representation 186 of control panel (e.g., via HTML document) accordingly as developer makes modification(s). In block 840, the computer system/server 12, responsive to the developer indicating modification(s) are finalized, creates a corresponding update UI message 141. As described above, the update UI message 141 may have a tree structure corresponding to a view tree of an application. Thus, in block 845, the computer system/server 12 may form the update UI message 141 using a protocol 590 having a tree structure corresponding to a view tree of a view (e.g., 510) of the application. In block 850, the computer system/server 12, responsive to input from the developer, sends the message 141 to one, some, or all computing devices 112 having the adaptive UI library 190.

Figure 9A:
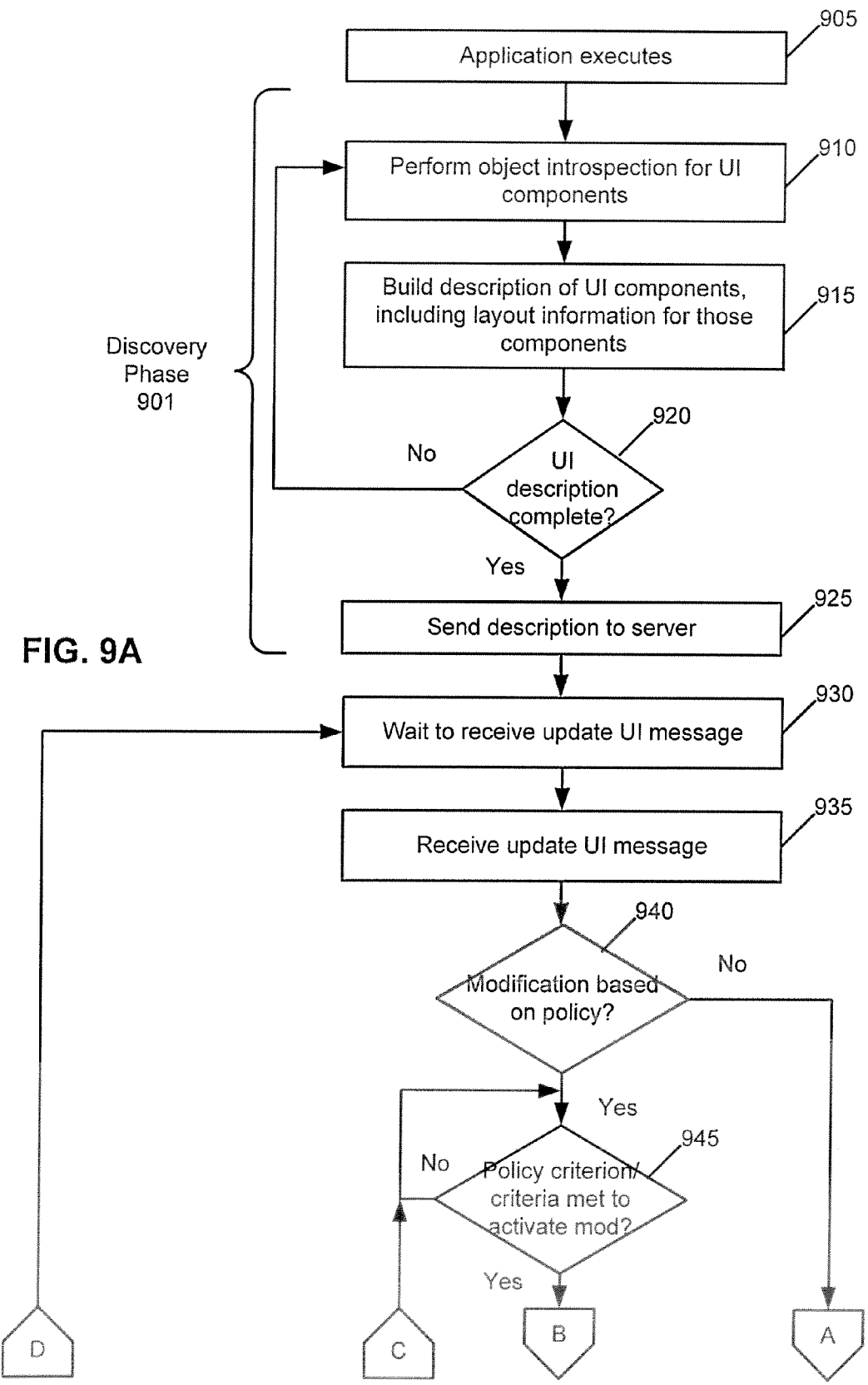
FIGS. 9A and 9B, is a logic flow diagram performed by a computing device 112 for transparently enabling software applications with adaptive user interfaces, and illustrates the operation of an exemplary method, a result of execution of computer program instructions embodied on a computer readable memory, and/or functions performed by logic implemented in hardware, in accordance with an exemplary embodiment.
Figure 9B:
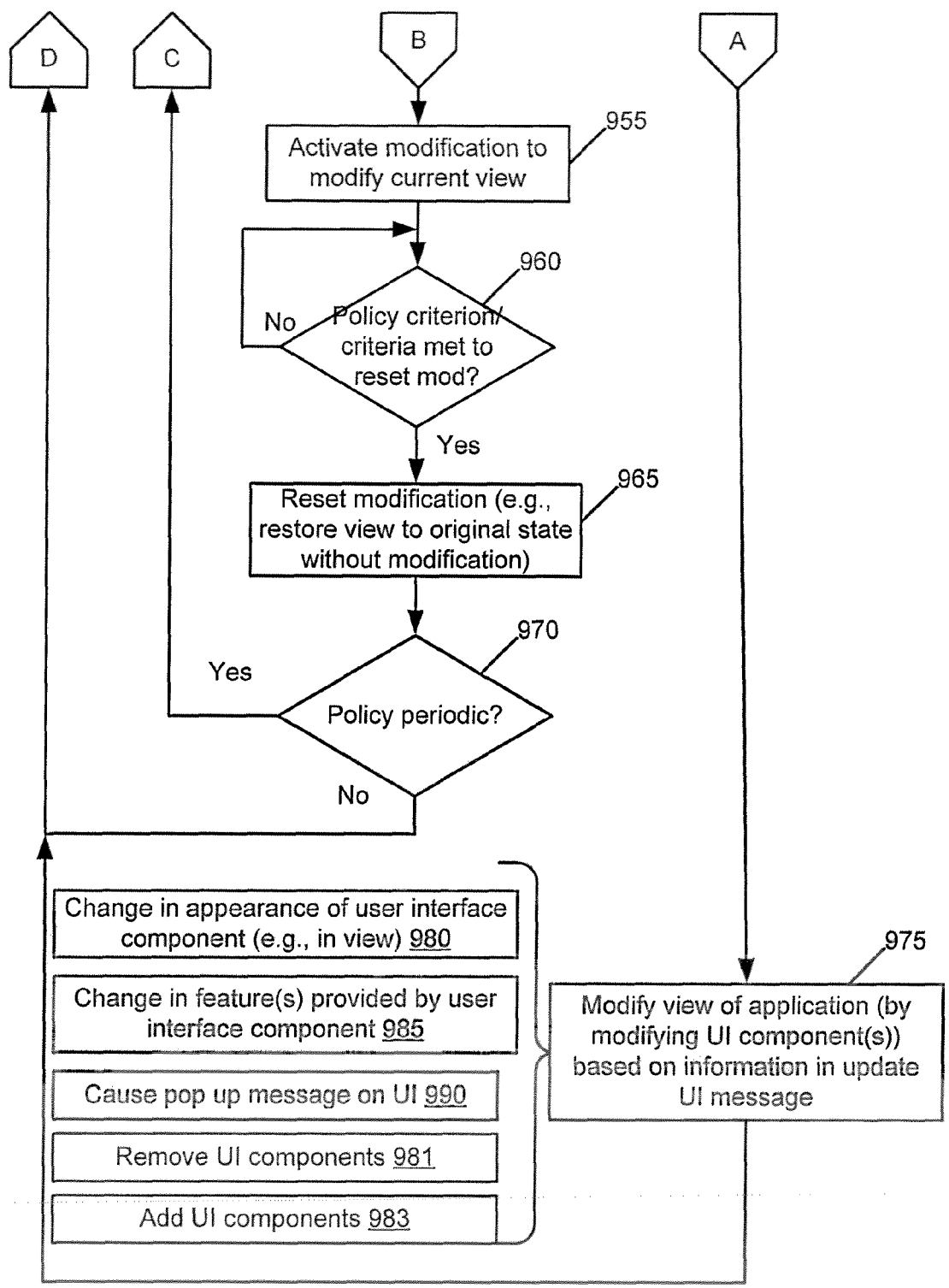

Turning to FIG. 9, which includes FIGS. 9A and 9B, this figure is a logic flow diagram performed by a computing device 112 for transparently enabling software applications with adaptive user interfaces. FIG. 9 illustrates the operation of an exemplary method, a result of execution of computer program instructions embodied on a computer readable memory, and/or functions performed by logic implemented in hardware, in accordance with an exemplary embodiment. The blocks in FIG. 9 may be assumed to be interconnected means for performing the corresponding functions in the blocks. The operations in the blocks are assumed to be performed by the computing device 112, e.g., under control of the adaptive UI 190.

In block 905, the instrumented application 140 executes, for instance in response to a user selecting the application via a touchscreen (as display 124-1). For the first execution of the instrumented application 140, the adaptive UI 190 enters a discovery phase 901. The discovery phase includes, in block 910, the adaptive UI 190 performing object inspection for UI components. As described above, in object oriented programming languages, reflection allows inspection of classes, interfaces, fields and methods at runtime without knowing the names of the interfaces, fields, methods at compile time. Reflection also allows instantiation of new objects and invocation of methods. In block 915, the adaptive UI 190 builds a description 194 of UI components, including layout information for those components. It is determined in block 920 if the UI description is complete. Such a description 194 can therefore have a description of all views creatable by the instrumented application 140. If not (block 920=No), the flow continues in block 910. If so (block 920=Yes), the adaptive UI 190 sends (block 925) the description 194 to the computer system/server 12.

Blocks 930 onward form a post-discovery phase. In this phase, it is assumed that a complete description 194 of the original set of views of the instrumented application 140 has been made. In block 930, the adaptive UI 190 waits to receive an update UI message 141. In response to an update UI message 141 has been received (block 935), the adaptive UI 190 determines if the modification is based on a policy in block 940. It is noted that the messages may be polled by the instrumented application 140 (and from the computer system/server 12) so messages cannot be received without the application 140 being currently executed. If messages are pushed from the computer system/server 12 to the instrumented application 140, the client (e.g., computing device 112) would typical send back receipt of the message and if the server 12 does not receive this receipt in a given amount of time, the server 12 would try again to send the message. If the modification is based on a policy (block 940=Yes), the adaptive UI 190 determines (block 945) if the policy criterion/criteria is/are met to activate the modification. If not (block 945=No), the flow proceeds to wait at block 945.

If the policy criterion/criteria is/are met to activate the modification (block 945=Yes), the adaptive UI 190 activates (block 955) the modification to modify the current view on the UI 125-1. Block 960 performs a waiting operation to determine whether to reset the modification in accordance with whether or not the policy criterion/criteria to reset the modification has/have been met. If not (block 960=No), the flow waits at block 960; if so (block 960=Yes), the adaptive UI 190 resets the modification in block 965. The resetting the modification typically restores the view to an original state without the modification.

In block 970, it is determined if the policy is periodic (e.g., occurs every day, during weekdays or weekends, and the like). If so (block 970=Yes), the flow continues to block 945. If not (block 970=No), the flow continues at block 930.

If the modification is not based on policy (block 940=No), in block 975, the adaptive UI 190 modifies the view of the application (by modifying one or more user interface components) based on the information in the update UI message 141. Block 975 may be performed. e.g., by a change in appearance of user interface components provided by the view (e.g., such as changing text from one color to another) (block 980); by a change in features provided by the user interface component (such as changing a drop down box to select only one copy instead of one or more copies or by removing a feature or adding a feature) (block 985); causing a pop up message to be performed (e.g., on top of the current view) (block 990); remove one or more user interface components (block 981); and/or adding one or more user interface components. After block 974, the flow proceeds to block 930.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium does not include propagating signals and may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
receiving, by an adaptive user interface library instrumented into an application executable by a computing device, a message from a developer indicating one or more modifications should be performed to one or more user interface components of the application able to be rendered on a display of the computing device, wherein the one or more user interface components comprise one or more objects and wherein the message is formed in a tree structure wherein views created by the application are higher in the tree structure than are objects in the views and closer to a root of the tree structure, wherein the objects in the views are higher in the tree structure than are attributes of the objects, and wherein the attributes are leaves of the tree structure,
wherein the adaptive user interface library is transparent to the developer, and
wherein the adaptive user interface library is injectable into the application at a post-compile time;
wherein the adaptive user interface library is written using native Application Programming Interface (APIs) provided by the developer;
modifying, by the adaptive user interface library, the one or more user interface components according to the one or more modifications to create one or more modified user interface components; and
causing, by the adaptive user interface library, the one or more modified user interface components to be rendered on the display of the computing device.

2. The method of claim 1, wherein modifying further comprises:
intercepting, by one or more overriding objects, one or more calls to one or more Original objects, wherein the one or more overriding objects override corresponding ones of the one or more Original objects;

causing by the one more overriding objects the one or more user interface components to be modified according to the one or more modifications; and calling by the one or more overriding objects the one or more Original objects.

3. The method of claim 2, wherein the one more overriding objects can cause the one or more user interface components to be modified because the one or more overriding objects control one or more attributes that indicate the corresponding one or more modifications to one or more subsystems that realize modification of the one or more user interface components.

4. The method of claim 1, further comprising performing a discovery phase comprising building a description of user interface components, including layout information for those user interface components, for the application and sending one or more indications of the description to a server.

5. The method of claim 1, wherein modifying is performed in accordance with one or more policies.

6. The method of claim 5, wherein a policy comprises implementing the one or more modifications.

7. The method of claim 5, wherein a policy comprises one of preventing a user from performing an action using the one or more user interface components or allowing the user to perform an action using the one or more user interface components.

8. The method of claim 5, wherein the modifying is performed based on the one or more policies and responsive to one or more criteria being met.

9. The method of claim 8, wherein the one or more criteria comprise one or more of: the one or more policies being temporary; the one or more policies occurring within one or more time limits; the one or more policies occurring within one or more times of a day; the one or more policies occurring at one or more locations; the one or more policies depending on one or more thresholds to user action; and the one or more policies depending on sensor data.

10. The method of claim 8, wherein the modifying is performed in response to a first of the one or more criteria being met and further comprising removing the one or more modifications from the one or more modified user interface components to restore the one or more modified user interface components to Original states in response to a second of the one or more criteria being met.

11. The method of claim 1, wherein the modifying further comprises causing a pop up message to be created on the display.

12. The method of claim 1, wherein the modifying further comprises one of removing at least one of the one or more user interface components or adding one or more new user interface components.

13. The method of claim 1, wherein the one or more modifications are to a feature provided by the one or more user interface components for the application.

14. The method of claim 1, wherein the one or more modifications are to an appearance of the one or more user interface components.

15. A method, comprising:
accessing a description of a plurality of user interface components for an application executable on a computing device, wherein the plurality of user interface components are able to be rendered by the application on a display of the computing device, wherein the application is transparent to a developer using native Application Programming Interface (APIs) provided by the developer;

allowing the developer to modify information concerning one or more of the plurality of user interface components;

forming, responsive to one or more modifications by the developer to the information, one or more messages to allow the one or more modifications and the corresponding one or more user interface components to be determined, wherein the one or more messages are formed in a tree structure wherein views created by the application are higher in the tree structure than are objects in the views and closer to a root of the tree structure, wherein the objects in the views are higher in the tree structure than are attributes of the objects, and wherein the attributes are leaves of the tree structure; and sending the one or more messages to one or more computing devices having the application.

16. The method of claim 15, wherein allowing further comprises sending one or more representations of the one or more user interface components to the developer using at least one network.

17. The method of claim 16, wherein forming is performed at least using a data-interchange format.

18. The method of claim 15, wherein allowing further comprises allowing the developer to modify one or more policies corresponding to the one or more user interface components and forming further comprises forming the one or more messages to allow the one or more policies corresponding to the one or more user interface components to be determined.

19. The method of claim 18, wherein allowing further comprises allowing the developer to modify one or more criteria corresponding to the one or more policies and forming further comprises forming the one or more messages to allow the one or more policies and the one or more criteria corresponding to the one or more user interface components to be determined.

20. The method of claim 19, wherein the one or more criteria comprise one or more of: the one or more policies being temporary; the one or more policies occurring within one or more time limits; the one or more policies occurring within one or more times of a day; the one or more policies occurring at one or more locations; the one or more policies depending on one or more thresholds to user action; and the one or more policies depending on sensor data.

* * * * *